United States Patent
Nagesh et al.

(10) Patent No.: US 7,652,986 B2
(45) Date of Patent: Jan. 26, 2010

(54) ROUTE DETERMINATION WITH DIFFERENTIAL DELAY COMPENSATION FOR VIRTUALLY-CONCATENATED DATA TRAFFIC

(75) Inventors: Harsha S. Nagesh, New Providence, NJ (US); Viswanath Poosala, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 971 days.

(21) Appl. No.: 10/856,444

(22) Filed: May 28, 2004

(65) Prior Publication Data

US 2005/0286425 A1 Dec. 29, 2005

(51) Int. Cl.
*H04J 1/00* (2006.01)

(52) U.S. Cl. .................................. 370/226; 370/395.21

(58) Field of Classification Search ...... 370/229–238.1, 370/395.1, 395.21, 401, 412, 428–429, 389, 370/392, 216–228; 709/238, 241
See application file for complete search history.

(56) References Cited

U.S. PATENT DOCUMENTS

| | | | |
|---|---|---|---|
| 6,202,082 B1* | 3/2001 | Tomizawa et al. ........... | 370/389 |
| 6,678,475 B1* | 1/2004 | Turban et al. ................. | 398/79 |
| 2002/0018468 A1* | 2/2002 | Nishihara .................... | 370/389 |
| 2004/0076176 A1* | 4/2004 | Kfir ............................ | 370/465 |
| 2004/0252633 A1* | 12/2004 | Acharya et al. ............. | 370/242 |

OTHER PUBLICATIONS

U.S. Appl. No. 10/446,220, filed May 28, 2003, S. Acharya et al., "Fast Restoration for Virtually-Concatenated Data Traffic."

(Continued)

*Primary Examiner*—Ricky Ngo
*Assistant Examiner*—Pao Sinkantarakorn
(74) *Attorney, Agent, or Firm*—Ryan, Mason & Lewis, LLP

(57) ABSTRACT

Virtually-concatenated data traffic is routed in a network comprising a plurality of nodes, the plurality of nodes including one or more nodes that are differential delay enabled and one or more nodes that are not differential delay enabled. For a given traffic demand to be routed from a source node to a destination node in the network, at least one route is determined for routing the demand between an intermediate node that is differential delay enabled and one of the source node and the destination node that is not differential delay enabled. Also, a set of routes is determined for routing the demand between the intermediate node that is differential delay enabled and at least one other node of the network, that may or may not be differential delay enabled, with each of the routes in the set corresponding to a member of a virtually-concatenated group. The given traffic demand is routed from the source node to the destination node, utilizing the at least one route and the set of routes.

19 Claims, 7 Drawing Sheets

OTHER PUBLICATIONS

U.S. Appl. No. 10/745,881, filed Dec. 26, 2003, S. Acharya et al., "Route Determination Method and Apparatus for Virtually-Concatenated Data Traffic."

U.S. Appl. No. 10/853,422, filed May 25, 2004, S. Acharya et al., "Link Delay Determination Using Virtual Concatenation."

J. Edmonds et al., "Theoretical Improvements in Algorithmic Efficiency for Network Flow Problems," Journal of ACM, vol. 19, No. 2, pp. 248-264, Apr. 1972.

James B. Orlin, "A Faster Strongly Polynomial Minimum Cost Flow Algorithm," Proceedings of the 20th ACM Symposium on the Theory of Computing, pp. 377-387, 1988.

G. Garg et al., "Managing Differential Delay in SONET Architectures," EE Times, pp. 1-5, Jan. 2002.

D. Karger et al., "On Approximating the Longest Path in a Graph," Algorithmica 18, pp. 1-17, 1997.

* cited by examiner

FIG. 2

INPUT Network $G(V, E)$, new demand $D$ from bandwidth $B$, current differential delay buffer capacity $C$
PROBLEM Route the demand $D$ in $G$ over diverse paths which minimize the differential delay
OUTPUT A set of routes for members of the VCG carrying $D$
ALGORITHM
Let STS-$Fc$ be the smallest SONET frame that can carry bandwidth $B$
Choose $T$ from $F-1$ to 1 sequentially
    For all edges in $E$
    Set their capacity to highest SONET rate ($N$ units for STS-$Nc$) they can carry or to $T$
    whichever is smaller
    Find a feasible flow of $F$ in $G$
    if (solution exists)
        $d$ = differential delay for the solution
        $dmin = min(d, dmin)$
        if ($dmin = d$) $Tmin = T$
$Cmin$ = Buffer required to compensate minimum differential delay $dmin$
if $Cmin \leq C$ route the flow in units of $Tmin$ flow per tributary of the VCG

FIG. 4

INPUT Network $G(V, E)$, new demand $D$ for bandwidth $C'$ between node $B$ and node $I$
PROBLEM Route the demand $D$ in $G$ for node $B$ to node $I$
OUTPUT A set of routes for members of the VCG carrying $D$ from node $B$ to an intermediate node $X$ and a route from $X$ to destination node $I$
ALGORITHM
Let STS-$Fc$ be the smallest SONET frame that can carry bandwidth $C'$
For each intermediate differential delay enabled node $X'$
    cost = Find the cost of the shortest path from $X'$ to $I$
    if (shortest path exists)
        For each edge of the shortest path decrement bandwidth $C'$
    else
        break; //node $X'$ is not a feasible intermediate node
For all edges in $E$
    Set their capacity to the highest SONET rate ($N$ units for STS-$Nc$) they can carry or to $F$ whichever is smaller
Find a feasible flow of $F$ in $G$ from $B$ to $X'$
if (flow solution exists)
    if (cost $\leq$ MinCost)
        MinCost = cost
        Solution = {Set of routes of the flow, Shortest path from $X'$ to $I$}

ROUTE DETERMINATION WITH DIFFERENTIAL DELAY COMPENSATION FOR VIRTUALLY-CONCATENATED DATA TRAFFIC

RELATED APPLICATIONS

The present invention is related to the inventions described in U.S. patent application Ser. No. 10/446,220, filed May 28, 2003 and entitled "Fast Restoration for Virtually-Concatenated Data Traffic," and U.S. patent application Ser. No. 10/745,881 filed Dec. 26, 2003 and entitled "Route Determination Method and Apparatus for Virtually-Concatenated Data Traffic," the disclosures of which are incorporated by reference herein.

FIELD OF THE INVENTION

The present invention relates generally to data communication networks which utilize virtual concatenation. More particularly, the invention relates to techniques for determining routes for virtually-concatenated data traffic in a manner which provides differential delay compensation.

BACKGROUND OF THE INVENTION

Circuit-switched network architectures, such as those based on synchronous optical network (SONET) or synchronous digital hierarchy (SDH) standards, were originally designed to support voice traffic using dedicated fixed-bandwidth connections. Although such networks are advantageous in that they incorporate substantial reliability and protection mechanisms, their primary disadvantage has been a lack of bandwidth efficiency.

Packet-switched network architectures, which include those based on asynchronous transfer mode (ATM) or Internet protocol (IP) standards, have traditionally been much better able than circuit-switched architectures to handle data traffic. Since data traffic is inherently bursty, it leads to underutilization of the fixed-bandwidth connections of conventional circuit-switched networks. Packet-switched network architectures provide the benefits of statistical multiplexing, which allows for better handling of bursty data traffic.

Recently, virtual concatenation (VC) and link capacity adjustment scheme (LCAS) protocols have been developed which allow more efficient use of the existing fixed-bandwidth connections associated with circuit-switched SONET/SDH network infrastructure. For example, these protocols are utilized in transmission of Ethernet over SONET (EoS) data traffic over metropolitan networks, and in numerous other data transmission applications. The VC and LCAS protocols are described in greater detail in, for example, ITU-T standards documents G.707 and G.7042, respectively, both of which are incorporated by reference herein.

Virtual concatenation generally allows a given source node of a network to form a virtually-concatenated group (VCG) which includes multiple members each associated with a corresponding data stream. The different data streams may then be transmitted over diverse routes through the network from the source node to a given destination node. The destination node recombines the streams to reconstruct the original VCG.

The LCAS protocol enhances the basic virtual concatenation functionality described above by allowing so-called "hitless" addition and deletion of members from a VCG, that is, addition and deletion of members without the introduction of errors into the transmitted data. The LCAS protocol also enables a VCG to operate at a reduced capacity after the failure of routes associated with one or more members, by allowing the temporary removal of members associated with failed routes from the VCG.

The above-cited U.S. patent application Ser. No. 10/446,220 and Ser. No. 10/745,881 provide additional performance improvements beyond those associated with the conventional VC and LCAS protocols.

When implementing VC or LCAS related techniques, it is often necessary to provide compensation for differential delays of the diverse routes over which the various members of a VCG are transmitted. Unfortunately, providing such a capability in conventional practice typically requires that each network node be configured to include an expensive, high-capacity differential delay buffer. Since a given destination node may receive different diversely-routed members at different times, the differential delay buffer is used to store member data until all members are received and the original data stream can be properly reconstructed.

Additional details regarding conventional aspects of differential delay compensation can be found in, for example, G. Garg et al., "Managing Differential Delay in SONET Architectures," EE Times, January 2002, which is incorporated by reference herein.

The cost of upgrading an entire network with differential delay buffers is often prohibitive. As a result, most service providers will not upgrade their complete network all at once to support data services using VC and LCAS, but will instead phase these capabilities in over time.

A drawback of conventional techniques is that they are not specifically designed to provide a desired level of differential delay compensation in situations in which only a subset of the network nodes includes differential delay buffers.

A further complication arises from the fact that several source-destination traffic demands may share the same differential delay buffers. Thus, when routing a given data stream using virtual concatenation over diverse paths, the routing algorithm needs to determine the current utilization of the relevant differential delay buffers. Not all sets of diverse paths may be feasible, since one or more of the sets of diverse paths could result in a differential delay that cannot currently be compensated by the available buffer space.

Accordingly, a need exists for improved route determination techniques for virtually-concatenated data traffic, which are capable of providing desired levels of differential delay compensation in situations in which differential delay buffers are incorporated into only a subset of the network nodes.

SUMMARY OF THE INVENTION

The present invention meets the above-noted need by providing improved routing algorithms for determining routes for virtually-concatenated data traffic. The described routing algorithms are particularly well suited for use in providing differential delay compensation in situations in which differential delay buffers are present in less than all of the nodes of a given network.

In accordance with one aspect of the invention, virtually-concatenated data traffic is routed in a network comprising a plurality of nodes, the plurality of nodes including one or more nodes that are differential delay enabled and one or more nodes that are not differential delay enabled. For a given traffic demand to be routed from a source node to a destination node in the network, at least one route is determined for routing the demand between an intermediate node that is differential delay enabled and one of the source node and the destination node that is not differential delay enabled. Also, a set of routes is determined for routing the demand between the intermediate node that is differential delay enabled and at least one other node of the network, that may or may not be differential delay enabled, with each of the routes in the set corresponding to a member of a virtually-concatenated group. The given traffic demand is routed from the source node to the destination node, utilizing the at least one route and the set of routes.

The routes may be determined, for example, by a routing algorithm that determines the routes by processing a graph or other representation of the network.

Advantageously, the routing algorithms in the illustrative embodiments facilitate implementation of low-overhead, standards-compliant fast restoration techniques for virtually-concatenated EoS data traffic or other types of data traffic.

BRIEF DESCRIPTION OF THE DRAWINGS

FIG. 2 shows an exemplary routing algorithm utilizable for determining routes through a data transmission network, in accordance with the invention.

FIG. 4 shows another exemplary routing algorithm utilizable for determining routes through a data transmission network, in accordance with the invention.

DETAILED DESCRIPTION OF THE INVENTION

The invention will be illustrated herein in conjunction with illustrative embodiments of routing algorithms and associated restoration techniques, as well as a network-based system and example network nodes in which the algorithms and techniques may be implemented. It should be understood, however, that the invention is not limited to use with the particular routing algorithms, restoration techniques, network-based system or network node implementations described, but is instead more generally applicable to any routing application in which it is desirable to provide improved differential delay compensation.

The present invention in the illustrative embodiments to be described provides improved routing algorithms for use in determining routes for Ethernet over SONET (EoS) and other types of data traffic which utilize virtual concatenation.

The determined routes may be used in conjunction with a network protection technique which involves configuring a virtually-concatenated group (VCG) to include, in addition to its primary members as in a conventional implementation, at least one additional member, referred to herein as a "backup member," which does not transmit data traffic under normal operating conditions. Each of the primary and backup members of the VCG is assigned a data transmission route between first and second nodes of the network. The first and second nodes may be a source-sink node pair, an ingress-egress node pair, or any other pair of network nodes. If a route assigned to one of the primary members fails, the route assigned to the backup member is utilized for restoring data traffic of that primary member. Such an arrangement will be described in greater detail below in conjunction with FIGS. 1A and 1B.

Figure 1A:
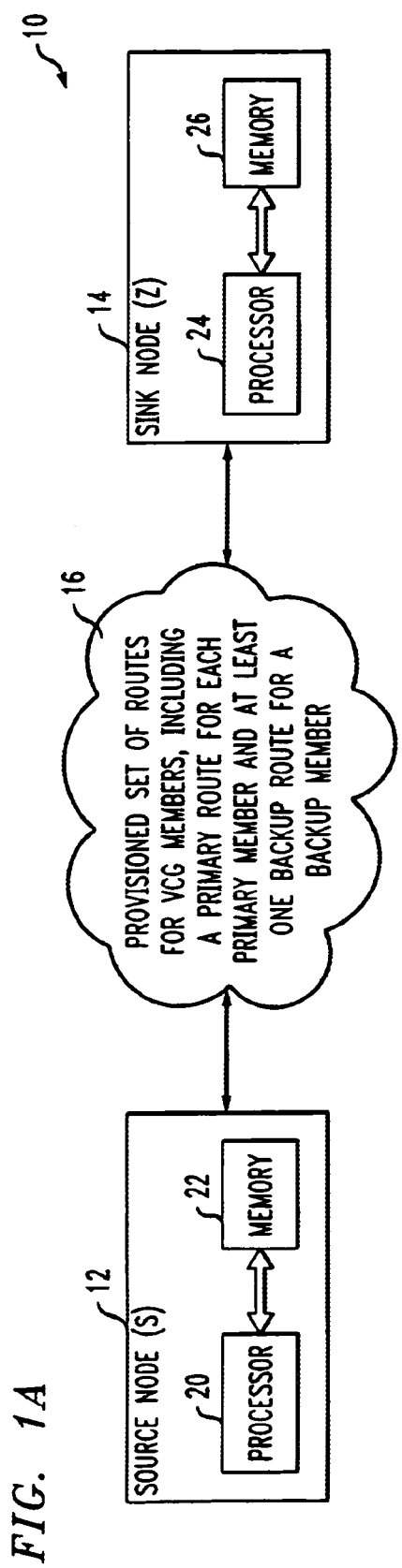
FIG. 1A illustrates a portion of a data transmission network in which the invention may be implemented.

Referring now to FIG. 1A, a data transmission network 10 includes a source node 12, a sink node 14, and a provisioned set of routes 16 for VCG members. It is to be appreciated that the figure shows only a portion of a typical network, for simplicity and clarity of description.

The source and sink nodes are also denoted herein as S and Z nodes, respectively. The source node 12 includes a processor 20 coupled to a memory 22. Similarly, the sink node 14 includes a processor 24 coupled to a memory 26. The memory elements of the nodes 12, 14 store one or more software programs for execution by the corresponding processors in implementing virtual concatenation operations such as forming VCGs and determining appropriate routes for VCG members, using the above-noted G.707 and G.7042 standards documents, or other communication protocols. The conventional aspects of the operation of nodes 12, 14 in transmitting virtually-concatenated data traffic through network 10 are well known in the art and therefore will not be described in detail herein.

In accordance with the techniques described in the above-cited U.S. patent application Ser. No. 10/446,220, the VCG for which the set of routes 16 are provisioned includes a plurality of primary members and at least one backup member.

A "primary member" as the term is used herein refers generally to a conventional VCG member which is associated with a corresponding data stream to be transmitted from the source node to the sink node under normal operating conditions.

A "backup member" as the term is used herein refers generally to an additional VCG member which is not associated with any particular data stream to be transmitted from the source node to the sink node under normal operating conditions.

The FIG. 1A arrangement is thus in contrast to conventional VCGs, in which each member is a primary member and there are no backup members.

It is generally preferably to form the VCG so as to include the minimum number of backup members required to protect the entire VCG against a single route failure.

For example, in an embodiment in which all of the primary members are diversely routed from source node 12 to sink node 14, only a single backup member may be used. Therefore, in a VCG formed to include N primary members and one backup member, each having the same bandwidth allocation, protection against the single route failure requires a bandwidth overhead that is only a fraction 1/N of the 100% bandwidth overhead associated with certain conventional techniques.

As another example, in an embodiment in which all of the primary members are not diversely routed, a minimum number of required backup members may be determined based on the link that carries data traffic from the greatest number of members. Generally, the minimum number of backup members required would be the same as the total number of primary members carried by the link supporting the greatest number of primary members.

Such an embodiment may be viewed as including, for example, a number $N_x$ of primary members and a number $N_y$ of backup members, with diverse routing provided between the primary and backup members, but not necessarily within the set of $N_x$ primary members or $N_y$ backup members.

In the above examples, configuring the VCG results in a substantial reduction in bandwidth overhead relative to conventional SONET 1+1 primary-backup protection. This conventional approach requires that each primary route have a corresponding backup route, resulting in 100% bandwidth overhead. In the illustrative embodiments, the bandwidth overhead decreases with the diversity of the routes of the primary members, and as noted above, for N diversely routed primary members may be as low as a fraction 1/N of the conventional 100% bandwidth overhead requirement.

It was indicated above that the one or more backup members of the VCG are not used to transmit data traffic under normal operating conditions. However, in the event of the failure of a route associated with one or more of the primary members, the affected data traffic may be restored utilizing the backup member(s). For example, if the source node 12 detects the failure of the route assigned to a given member, as reported by the sink node 14 or otherwise, it "discards" the failed member and starts sending the corresponding data traffic on a backup member. Advantageously, this switching of data traffic in the illustrative embodiments can be achieved in a very short amount of time, in some cases as short as about two milliseconds.

It should be noted that a single backup member need not be capable of restoring all of the data traffic associated with a given failed primary member. For example, in alternative embodiments, one or more backup members may each be utilized for partial restoration of the data traffic of a given failed primary member. The term "restoring data traffic" and similar terminology used herein should be understood to include without limitation full or partial restoration of data traffic of a failed primary member by one or more backup members.

Figure 1B:
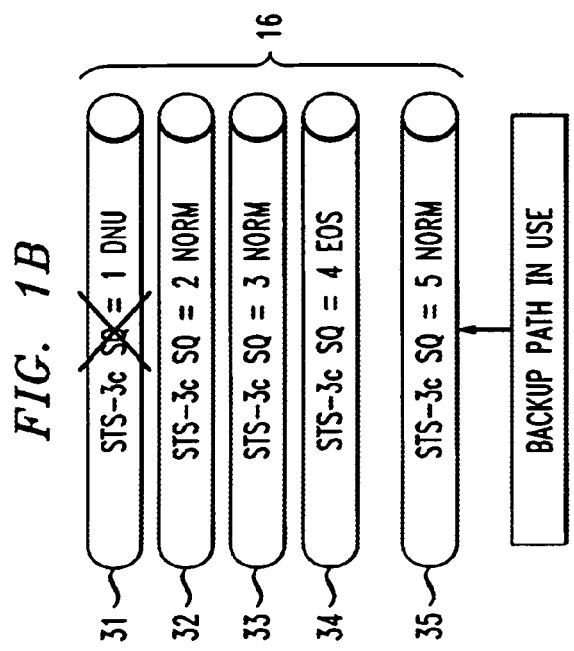
FIG. 1B shows an example of a provisioned set of routes for a given virtually-concatenated group (VCG) configured in accordance with the invention.

FIG. 1B shows a more particular example of the provisioned set of routes 16 in network 10 of FIG. 1A. In this example, the corresponding VCG is formed to include a total of five members, with four primary members and one backup member. The primary members and their associated routes are designated as elements 31, 32, 33 and 34 in the figure. The backup member and its associated route is designated as element 35 in the figure. The members 31 through 35 have respective sequence (SQ) numbers 1 through 5.

Each of the primary and backup members has the same bandwidth in this example. More specifically, each of the members is configured to support data traffic associated with a conventional STS-3c data rate signal, where STS denotes "synchronous transport signal." The VCG in this example may be referred to as an STS-Xc-Yv VCG, where X=3 and Y in this case denotes the number of primary and backup members of the group.

It should be understood, however, that the invention does not require the use of any particular signal or bandwidth configuration for the individual members, or that all members have the same signal or bandwidth configuration.

Backup member 35 does not carry any data traffic during normal operation. The source node 12 therefore transmits a DO NOT USE (DNU) indicator in the LCAS control word (CTRL) for the backup member 35 during normal operation to ensure that the sink node does not pick up any data traffic from backup member 35.

The example of FIG. 1B more particularly illustrates not this normal operation condition, but instead a failure condition in which at least a portion of the route associated with primary member 31 has failed. Such a route failure is an example of what is more generally referred to herein as a "member failure." It is to be appreciated, however, that the term "member failure" as used herein is intended to include any type of failure associated with the corresponding primary member that prevents it from transmitting data at the desired rate.

A given failure may be signaled in accordance with the conventional LCAS protocol, in which the sink node 14 detects the failure and reports the status of the failed member as NOT-OK back to the source node 12.

Upon receiving notification of a member failure, the source node 12 switches the data traffic from the failed primary member to the backup member, and transmits a NORMAL (NORM) indicator in the LCAS control word for the backup member and the DNU indicator in the LCAS control word for the failed primary member.

In the example of FIG. 1B, as a result of this restoration process, the NORM indicator is transmitted for primary members 32, 33 and 34 and for the backup member 35, and the DNU indicator is transmitted for the failed primary member 31.

This illustrative embodiment thus distinguishes primary members from backup members of a given VCG under normal operation by sending the NORM indicator in the LCAS control words of the primary members and the DNU indicator in the LCAS control words of the backup members. In accordance with the foregoing description, the source node may be viewed as being operative, upon receiving notification of the failure of a primary member, to "swap" the NORM indicator value of the LCAS control word of the failed primary member, with the DNU indicator value of the LCAS control word of one of the backup members, in the next multiframe. At the end of the multiframe header, the source node may start putting the data on the backup member instead of the failed primary member. Therefore, from the time the source node has received the notification of failure, it generally takes one complete multiframe, that is, two milliseconds or eight milliseconds for respective higher order (HO) and lower order (LO) implementations, before the backup member can start carrying the data of the failed primary member.

The exemplary restoration technique described above in conjunction with FIGS. 1A and 1B can achieve a fast restoration time, as low as about two milliseconds in some cases, through the use of the above-noted modified LCAS protocol. Instead of using multiframe indicator (MFI) bits to send member status information from the sink node 14 to the source node 12, the modified LCAS protocol utilizes extra bits taken from reserve bits defined in the above-noted standards documents to send the member status information. Therefore, in the event of a member failure, the sink node can immediately send to the source node the status of the failed member instead of waiting for its turn to arrive in the refresh cycle. An important advantage of this approach is that it avoids the restoration delay problems attributable to excessive refresh time in the conventional LCAS protocol. Additional details regarding the modified LCAS protocol can be found in the above-cited U.S. patent application Ser. No. 10/446,220.

It should be noted that the above-described restoration techniques are not a requirement of the present invention, but may be desirable to implement in a given embodiment. The present invention can alternatively be implemented using conventional restoration techniques, or no restoration technique.

Figure 3:
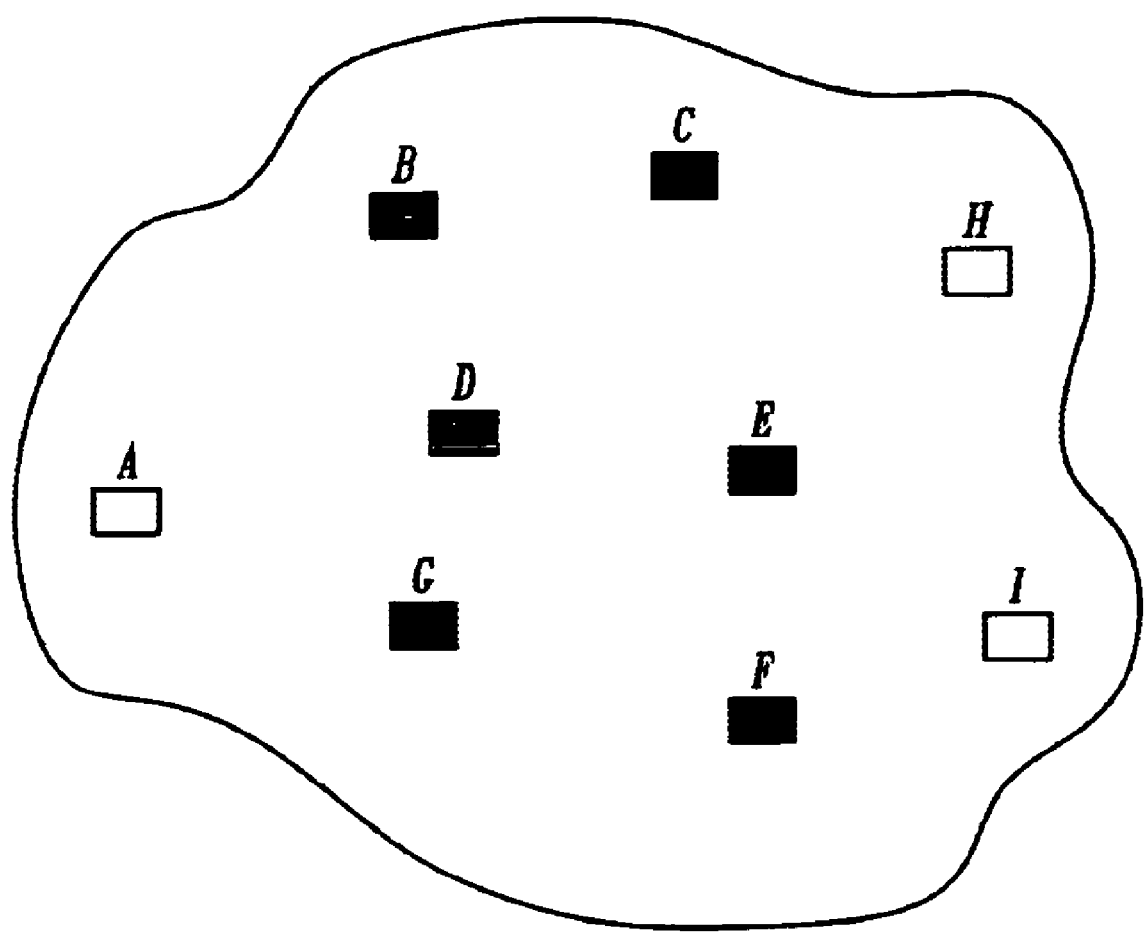
FIG. 3 shows a portion of a network in which fewer than all of the network nodes are equipped with differential delay buffers.

A number of exemplary routing algorithms for determining routes through a data transmission network, in accordance with the present invention, will now be described with reference to input, problem, output and algorithm step listings in FIGS. 2 and 4 and the simplified network shown in FIG. 3. It should be emphasized that the particular arrangements of FIGS. 2, 3 and 4 are presented by way of example, and other embodiments may utilize different routing algorithms and different network configurations.

Referring now to FIG. 2, a first exemplary routing algorithm is shown. The routing algorithm takes as input a network representation G(V, E), which generally denotes a graph G comprising a set of vertices V interconnected by edges E. The vertices and edges are also referred to herein as nodes and links, respectively. The input also includes a traffic demand D, illustratively referred to as a "new" demand, and a current differential delay buffer capacity C. The routing problem addressed by the FIG. 2 algorithm may be characterized as routing the demand D in G over diverse paths in such a manner that the differential delay is minimized. The output of the algorithm is a set of routes for members of the VCG carrying the demand D.

Generally, the FIG. 2 algorithm sequentially tries different ways to obtain a feasible splitting of the demand which minimizes the differential delay among all the diverse routes. If this differential delay can be supported by the current free capacity C of the differential delay buffer, the circuit is provisioned, and otherwise the circuit cannot be routed. Of course, if a single circuit between the source and destination nodes can satisfy the given bandwidth demand, then this will incur no differential delay. However, such a case is unlikely since bandwidth in a SONET network typically remains fragmented.

The operation of the algorithm is as follows. The algorithm initially lets STS-Fc be the smallest SONET frame rate that can carry bandwidth B. This allows F to be determined from B. The algorithm selects a value T from the range F-1 to 1, sequentially. For a given selected value T, the algorithm sets the capacity of each of the edges in E either to N units of flow, identified by determining the highest SONET rate STS-Nc that can be carried by the edge, or to T units of flow, whichever is the smaller of the two. Then, the algorithm finds a minimum-cost feasible flow of F units of flow in the graph G. In other words, the algorithm determines an appropriate routing for F units of flow through the graph G.

Any type of conventional flow routing algorithm may be used to determine the feasible flow for F units of flow in the graph G. For example, path augmentation based maximum flow algorithms may be used, such as those described in L. R. Ford, Jr., "Flows in Network," Princeton University Press, 1962, and J. Edmonds and R. M. Karp, "Theoretical Improvements in Algorithmic Efficiency for Network Flow Problems," Journal of ACM, Vol. 19, No. 2, 1990, both of which are incorporated by reference herein. Since the requirement is only to route F units of flow, these flow routing algorithms can be stopped once the sufficient flow is routed.

In any given network, there may be various distinct solutions for routing F units of flow, and thus the algorithm determines the minimum-cost solution. Such minimum-cost feasible flow solutions can be computed using conventional minimum-cost flow algorithms. Exemplary minimum-cost flow algorithms are described in R. K. Ahuja et al., "Network Flows: Theory, Algorithms, and Applications," Prentice Hall, 1993, J. B. Orlin, "A Faster Strongly Polynomial Minimum Cost Flow Algorithm," Proc. of the 20th ACM Symposium on the Theory of Computing, pp. 377-387, 1988, and W. S. Jewell, "Optimal Flow through Networks," Interim Technical Report 8, Operations Research Center, MIT, Cambridge, Mass., all of which are incorporated by reference herein.

If a minimum-cost solution exists, the differential delay d for that solution is determined, and the variable dmin is updated by setting it equal to the minimum of d and dmin. Then, if the updated dmin is equal to d, Tmin is set equal to the current value of T. The variable Cmin is defined as the buffer capacity required to compensate the minimum differential delay dmin. If Cmin is less than or equal to the current free capacity C, the flow is routed in units of Tmin flow per member or "tributary" of the VCG.

By way of example, once Tmin units of flow are routed through G, Tmin paths of unit flow may be extracted and each path may then be used to route a VCG member made up of an STS-1 circuit. This assumes that the VCG members are representable as or otherwise comprise STS-1 circuits. It should be understood that these and other assumptions referred to herein are not requirements of the invention, and need not apply in other embodiments. For example, in alternative embodiments, the VCG members may comprise other types of circuits, such as STS-3 circuits.

The FIG. 2 algorithm runs for only F-1 iterations, since the first iteration for T=F covers the case when a direct path from the source to destination exists, which does not require the support of virtual concatenation and differential delay compensation. Also, running the algorithm for F-1 iterations is appropriate as there may not be a solution for some values of T due to bandwidth being fragmented on the links and lack of availability of continuous slots to support T. However, it may be sufficient to terminate the iterations after finding the first feasible flow solution as further solutions may not improve the minimum delay value.

An alternative algorithm, to be described below in conjunction with FIG. 4, is particularly useful in an embodiment in which not all of the network nodes include differential delay buffers. A simplified diagram of a data transmission network of this type is shown in FIG. 3. The network includes a plurality of network nodes, denoted A, B, C, D, E, F, G, H and I. It should be noted that B in this context refers to a network node, and not to bandwidth as in other contexts herein. The shaded nodes in this example represent nodes which are differential delay enabled, that is, are equipped with differential delay buffers. The unshaded nodes are not so equipped. It is to be appreciated that the network drawing is considerably simplified, and that there are typically many more nodes and associated interconnections.

With reference now to FIG. 4, consider a new circuit with bandwidth C' that has to be provisioned between source node B and destination node I. Since SONET links are typically fragmented in bandwidth, it may be difficult to find a single path of bandwidth C' from B to I. It is possible that only some particular link in the path from B to I would alone not have the required bandwidth C', thus creating a bottleneck for provisioning the new circuit. In such cases, it is advantageous to leverage virtual concatenation capabilities to split the demand into smaller tributaries and route them over diverse paths, thus increasing the chances of successfully routing the demand. It is useful to see this technique as bypassing the bottleneck link using alternate sets of routes. However, when a circuit cannot be routed it may not be possible to algorithmically identify the bottleneck link which can be bypassed and hence one generally has to use flow-based routing techniques to take advantage of virtual concatenation. In addition, use of diverse routes has the benefit of enhanced protection as the complete demand is not prone to a single link failure in the network.

As indicated previously, in order to use virtual concatenation, typically both the source node and the destination node need to be differential delay enabled. However, in the present example, only source node B is differential delay enabled while destination node I is not. The algorithm shown in FIG. 4 allows virtual concatenation to be used in such a situation. As will become apparent, the algorithm can also be extended in a straightforward manner to the more general case in which neither the source node nor the destination node is differential delay enabled. In the FIG. 3 network, this more general case could be, for example, a new circuit demand between source node A and destination node H.

The FIG. 4 algorithm utilizes a "pinch point" routing approach, in which a demand is first routed from the source node to an intermediate node which is differential delay enabled and then from the intermediate node to the destination node. The intermediate node is the pinch point of the path from the source node to the destination node, and the algorithm is designed to choose an appropriate pinch point node that optimizes resource usage.

It should be noted that an optimal algorithm to find the shortest path from the source to the destination via a particular intermediate node is not known. However, the two-step approach utilized in the FIG. 4 algorithm has been determined to be well suited for many practical implementations. Other types of algorithms, optimal or sub-optimal, can be used in implementing the invention.

Generally, the FIG. 4 algorithm considers each differential delay enabled node as an intermediate node for which a feasible flow of C' exists. Among all such feasible flows, the algorithm selects the one that minimizes the cost of the shortest path from the intermediate node to the destination node. The cost of the routing from the intermediate node to the destination node can be determined, by way of example, as the number of links or "hops" through intermediate SONET network elements in the path. The routing from the source node to the intermediate node uses virtual concatenation and diverse paths.

The routing from the intermediate node to the destination node in this embodiment requires a single path with bandwidth C', and could become a bottleneck. So the algorithm first determines a route from the intermediate node to the destination node, reduces the available link bandwidths accordingly, and then determines a route from the source node to the intermediate node using virtual concatenation and diverse paths.

As shown in the figure, the routing algorithm of FIG. 4 takes as input a network representation G(V, E), and a demand D for an amount of bandwidth C' between network nodes B and I. The routing problem addressed by the FIG. 4 algorithm may be characterized as routing the demand D in G from node B to node I. The output of the algorithm is a set of routes for members of the VCG carrying the demand D from node B to an intermediate node X and a route from X to destination node I.

The operation of the algorithm is as follows. The algorithm initially lets STS-Fc be the smallest SONET frame rate that can carry C'. This allows F to be determined from C'. For each intermediate differential delay enabled node X', the cost of the shortest path from X' to I is determined. A differential delay enabled node is assumed in this context to be one which includes a differential delay buffer. If a shortest path exists, for each edge of the shortest path, the bandwidth C' is decremented. Otherwise, the process ends for the current X' since X' is not a feasible intermediate node. Next, for each of the edges in E, the algorithm sets the corresponding capacity either to N units of flow, identified by determining the highest SONET rate STS-Nc that can be carried by the edge, or to F units of flow, whichever is the smaller of the two. Then, the algorithm finds a minimum-cost feasible flow of F units of flow from B to X' in the graph G. In other words, the algorithm determines an appropriate routing for F units of flow through the graph G from node B to node X'.

Again, any type of conventional flow routing algorithm may be used to determine the feasible flow for F units of flow in the graph G. For example, minimum-cost feasible flow solutions can be computed using conventional minimum-cost flow algorithms.

The determined minimum-cost feasible flow identifies the set of routes for members of the VCG carrying the demand D from source node B to intermediate node X'. More specifically, once F units of flow are routed through G, F paths of unit flow may be extracted and each path may then be used to route a VCG member made up of an STS-1 circuit.

An advantage of the FIG. 4 algorithm is that it can provide desired levels of differential delay compensation in situations in which some of the network nodes do not include differential delay buffers. Thus, it provides enhanced network performance for practical applications in which data services using VC and LCAS are phased in over time.

It should be noted that F generally cannot be an arbitrary large number, since F in these example routing algorithms refers to the equivalent SONET frame rate (STS-Fc) to support a circuit of a particular bandwidth. The highest SONET frame rate currently defined by the standards is STS-768 and thus, F under these standards will never exceed 768.

The routing algorithms described above should be viewed as examples of routing algorithms in accordance with the invention, and it is to be appreciated that the invention can be implemented using other types of routing algorithms. The algorithms can be implemented in a distributed manner, in a centralized manner, or using a hybrid combination of distributed and centralized implementation, and the invention is not restricted in this regard.

A given one of the routing algorithms described above, as well as any associated restoration technique, may be implemented in a network-based system comprising a plurality of network nodes. Exemplary network and network node implementations of the invention will now be described with reference to FIGS. 5, 6 and 7.

Figure 5:
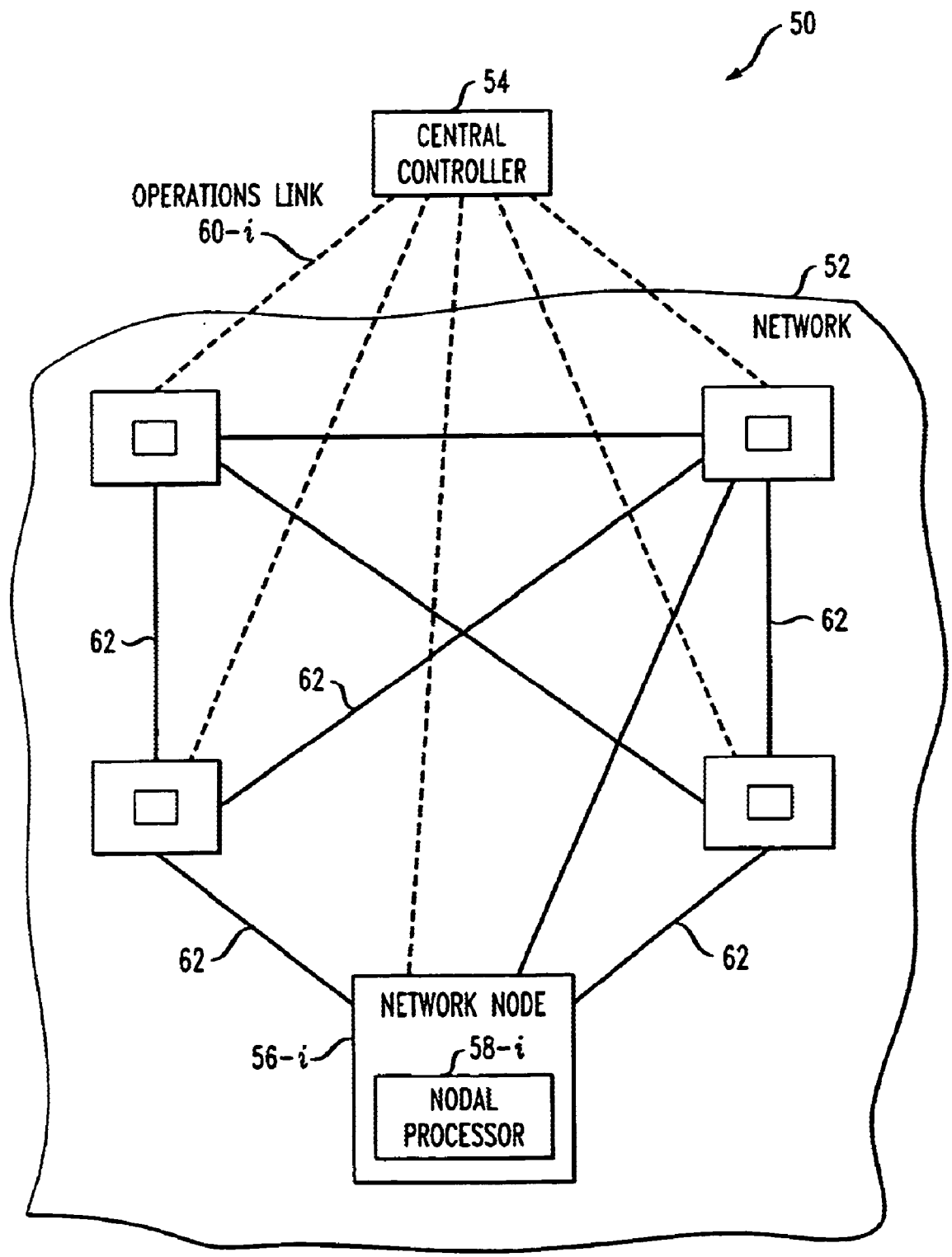
FIG. 5 shows an example network-based system in which a routing algorithm in accordance with the invention is implemented.

FIG. 5 shows an exemplary network-based system 50 in which techniques of the present invention can be implemented. The system 50 includes a network 52 and a central controller 54. The network 52 may comprise, by way of example, an Internet protocol (IP)-optical wavelength division multiplexed (WDM) mesh network, although the invention may be utilized with any type of network. The network 52 includes a number of nodes 56-$i$, i=1, 2, . . . N. Each of the nodes 56-$i$ includes a corresponding nodal processor 58-$i$. The nodes 56-$i$ of network 52 are interconnected by, for example, optical fiber connections 62. In this example, each of the nodes 56-$i$ has a fiber connection to three other nodes. Each of the nodes 56-$i$ is also connected to the central controller 54 via a corresponding operations link 60-$i$, shown as a dashed line in FIG. 5.

The central controller 54 and nodes 56-$i$ may each represent a computer, server, router, gateway or other suitable digital data processor programmed to implement at least a portion of a routing algorithm and associated restoration technique of the present invention.

It should be noted that the system of FIG. 5 is considerably simplified for purposes of illustration. The invention is well suited for use in large-scale regional, national and international networks which may include many subnetworks, each having hundreds of nodes.

The central controller 54 may or may not participate in route determination or associated restoration techniques, depending upon the particular implementation. For example, a fully distributed implementation need not utilize the central controller 54.

Figure 6:
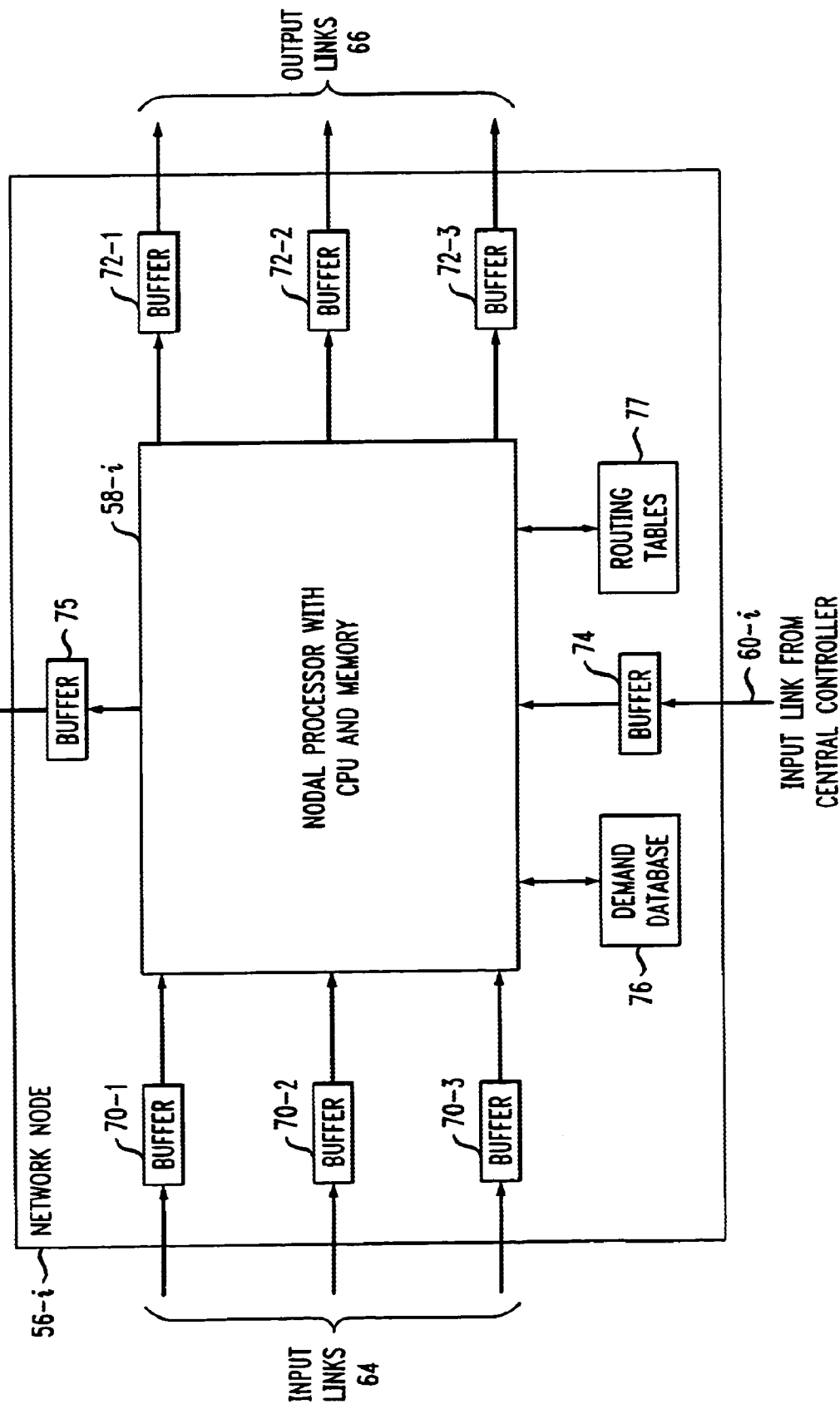
FIGS. 6 and 7 show different possible implementations of a given network node in the FIG. 5 system.

FIG. 6 shows one of the nodes 56-$i$ of network 52 in greater detail. The node 56-$i$ includes a nodal processor 58-$i$ which includes a central processing unit (CPU) and memory. A set of input links 64, corresponding to fiber connections 62 with three other nodes, are connected to buffers 70-1, 70-2 and 70-3 in node 56-i. The node 56-i supplies signals to three other nodes via a set of output links 66 also corresponding to fiber connections 62. The output links 66 are connected to buffers 72-1, 72-2 or 72-3. The buffers 70-1, 70-2 and 70-3 may provide optical-to-electrical conversion for signals received on input links 64, while the buffers 72-1, 72-2 and 72-3 may provide electrical-to-optical conversion for signals to be transmitted on output links 66.

The operational link 60-i of node 56-i to the central controller 54 includes an input operational link which is coupled to nodal processor 58-i via an input buffer 74, and an output operational link which receives signals from nodal processor 58-i via an output buffer 75. The node 56-i also includes a demand database 76 for storing demands for network capacity, and a set of routing tables 77 which specify routes through the network for particular demands. The demand database 76 and routing tables 77 may be components of a common memory within node 56-i, and may be combined with or otherwise associated with the memory of nodal processor 58-i. The node 56-i has been simplified for purposes of illustration, and as noted above may include a substantially larger number of input and output links, as required for a given application.

Figure 7:
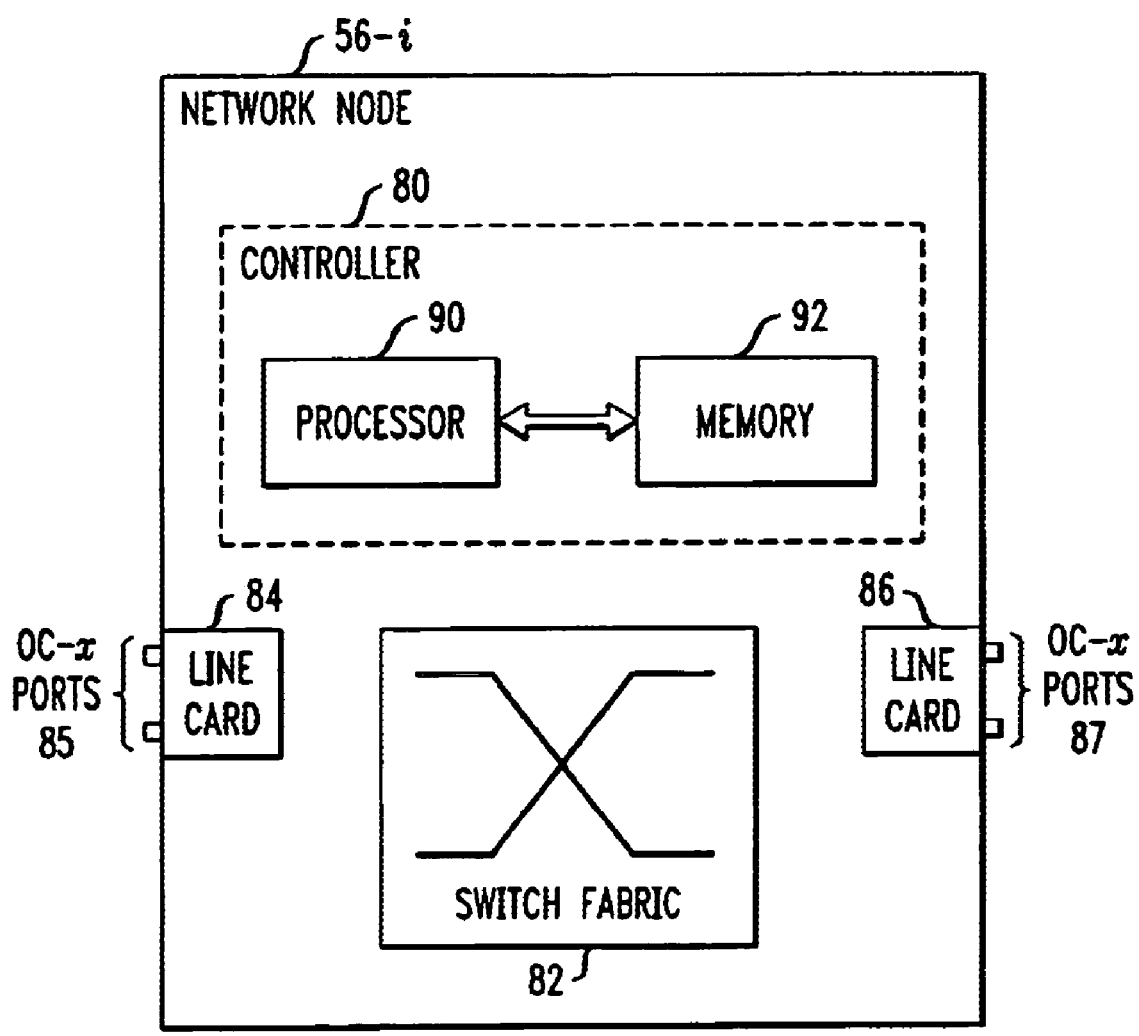

FIG. 7 shows another exemplary implementation of a given one of the network nodes 56-i of the FIG. 5 network-based system.

The network node 56-i in this example includes a controller 80, a switch fabric 82, a first line card 84 having a set of OC-x ports 85 associated therewith, and a second line card 86 having a set of OC-x ports 87 associated therewith. It should be understood that the node 56-i has again been simplified for purposes of illustration. For example, the node 56-i as shown in FIG. 7 may in practice include a substantially larger number of line cards and ports, as required for a given application.

The controller 80 includes a processor 90 and a memory 92. The processor 90 may be, e.g., a microprocessor, a microcontroller, an application-specific integrated circuit (ASIC) or other type of processing device, as well as portions or combinations of such devices. The memory 92 may include an electronic random access memory (RAM), a read-only memory (ROM) or other type of storage device, as well as portions or combinations of such devices. The memory 92 may be used to store a demand database for storing demands for network capacity, and a set of routing tables which specify routes through a corresponding network for particular demands, with the routes being determined at least in part using a routing algorithm of the present invention.

As indicated previously, the node 56-i may be an element of an optical network or other type of network which includes a very large number of nodes, and possibly a central controller. One or more of the nodes and the central controller may each represent a computer, processor-based switch or other type of processor-based device configured to provide routing and associated restoration in accordance with the invention.

The implementations described in conjunction with FIGS. 5, 6 and 7 are presented by way of example, and it is to be appreciated that the invention can be implemented in numerous other applications.

The above-described embodiments of the invention are intended to be illustrative only. For example, the techniques of the invention may be applied to any routing application, without regard to the type, arrangement or configuration of the network, network nodes, or communication protocols.

For example, although described in the context of virtually-concatenated EoS data traffic, the example routing algorithms described herein can be modified in a straightforward manner so as to be applicable to a wide variety of other types of data traffic.

Also, in alternative embodiments the particular steps utilized in a given routing algorithm may be varied from those steps shown in the foregoing example routing algorithms.

These and numerous other alternative embodiments within the scope of the following claims will be readily apparent to those skilled in the art.

We claim:

1. A method of routing virtually-concatenated data traffic in a network comprising a plurality of nodes, the plurality of nodes including one or more nodes that are differential delay enabled and one or more nodes that are not differential delay enabled, the method comprising, for a given traffic demand to be routed from a source node to a destination node in the network, the steps of:

determining at least one route for routing the demand between an intermediate node that is differential delay enabled and one of the source node and the destination node that is not differential delay enabled; and determining a set of routes for routing the demand between the intermediate node that is differential delay enabled and at least one other node of the network, each of the routes in the set corresponding to a member of a virtually-concatenated group;

wherein a given unit of flow within the given traffic demand is routed from the source node to the destination node over both a first route and a second route, the first route being within the at least one route and the second route being within the set of routes.

2. The method of claim 1 wherein the at least one other node of the network comprises the source node.

3. The method of claim 1 wherein the at least one other node of the network comprises the destination node.

4. The method of claim 1 wherein neither the source node nor the destination node is differential delay enabled.

5. The method of claim 1 wherein a given one of the nodes that is differential delay enabled is differential delay enabled via incorporation of a differential delay buffer therein.

6. The method of claim 1 wherein the set of routes is determined by determining a plurality of sets of diverse routes, each corresponding to a feasible splitting of the demand, and selecting a particular one of the sets as the set which exhibits a specified differential delay characteristic between its routes.

7. The method of claim 6 wherein the selected set of routes comprises a set of the plurality of sets which exhibits a least amount of differential delay between its routes.

8. The method of claim 6 wherein the selected set of routes comprises a set of the plurality of sets which exhibits a differential delay between its routes that is less than or equal to a current free capacity of a differential delay buffer of the intermediate node.

9. The method of claim 1 wherein the set of routes is determined utilizing a routing algorithm that determines the set of routes by processing a representation of the network.

10. The method of claim 9 wherein the routing algorithm determines the set of routes by determining a feasible flow of F units of flow in the network representation.

11. The method of claim 10 wherein the routing algorithm determines F from a bandwidth of the demand, with STS-Fc denoting a smallest SONET frame rate that can carry the bandwidth of the demand.

12. The method of claim 1 wherein the routing algorithm determines, for the intermediate differential delay enabled node, a cost of a shortest path from said intermediate differential delay enabled node to said one of the source node and the destination node that is not differential delay enabled, and decrements a bandwidth of the traffic demand from an available bandwidth for each of a plurality of links of the shortest path.

13. The method of claim 1 wherein at least one of the determining steps is implemented at least in part in software running on a processor of a node or other element of the network.

14. A method of routing virtually-concatenated data traffic in a network comprising a plurality of nodes, the plurality of nodes including one or more nodes that are differential delay enabled and one or more nodes that are not differential delay enabled, the method comprising, for a given traffic demand to be routed from a source node to a destination node in the network, the steps of:
- determining at least one route for routing the demand between an intermediate node that is differential delay enabled and one of the source node and the destination node that is not differential delay enabled; and
- determining a set of routes for routing the demand between the intermediate node that is differential delay enabled and at least one other node of the network, each of the routes in the set corresponding to a member of a virtually-concatenated group;
- wherein the given traffic demand is routed from the source node to the destination node over the at least one route and the set of routes;
- wherein the set of routes is determined utilizing a routing algorithm that determines the set of routes by processing a representation of the network;
- wherein the routing algorithm determines the set of routes by determining a feasible flow of F units of flow in the network representation; and
- wherein the routing algorithm selects a value T that is less than F but greater than or equal to 1, and wherein for the selected value T, and for each of a plurality of links in the network representation, the routing algorithm sets a corresponding capacity either to N units of flow, identified by determining a highest SONET rate STS-Nc that can be carried by the link, or to T units of flow, whichever is the smaller of the two, and then determines an appropriate routing for F units of flow through the network representation.

15. A method of routing virtually-concatenated data traffic in a network comprising a plurality of nodes, the plurality of nodes including one or more nodes that are differential delay enabled and one or more nodes that are not differential delay enabled, the method comprising, for a given traffic demand to be routed from a source node to a destination node in the network, the steps of:
- determining at least one route for routing the demand between an intermediate node that is differential delay enabled and one of the source node and the destination node that is not differential delay enabled; and
- determining a set of routes for routing the demand between the intermediate node that is differential delay enabled and at least one other node of the network, each of the routes in the set corresponding to a member of a virtually-concatenated group;
- wherein the given traffic demand is routed from the source node to the destination node over the at least one route and the set of routes;
- wherein the routing algorithm determines, for the intermediate differential delay enabled node, a cost of a shortest path from said intermediate differential delay enabled node to said one of the source node and the destination node that is not differential delay enabled, and decrements a bandwidth of the traffic demand from an available bandwidth for each of a plurality of links of the shortest path; and
- wherein, for each of a plurality of links in a representation of the network, the routing algorithm sets a corresponding capacity either to N units of flow, identified by determining a highest SONET rate STS-Nc that can be carried by the link, or to a feasible flow of F units of flow, whichever is the smaller of the two, and then determines an appropriate routing for F units of flow through the network representation.

16. An apparatus for use in routing virtually-concatenated data traffic in a network comprising a plurality of nodes, the plurality of nodes including one or more nodes that are differential delay enabled and one or more nodes that are not differential delay enabled, the apparatus comprising:
- a processor; and
- a memory coupled to the processor;
- wherein the processor is operative, for a given traffic demand to be routed from a source node to a destination node in the network, to perform the steps of:
- determining at least one route for routing the demand between an intermediate node that is differential delay enabled and one of the source node and the destination node that is not differential delay enabled; and
- determining a set of routes for routing the demand between the intermediate node that is differential delay enabled and at least one other node of the network, each of the routes in the set corresponding to a member of a virtually-concatenated group;
- wherein a given unit of flow within the given traffic demand is routed from the source node to the destination node over both a first route and a second route, the first route being within the at least one route and the second route being within the set of routes.

17. The apparatus of claim 16 wherein the apparatus is implemented in a distributed manner within one or more of the network nodes.

18. The apparatus of claim 16 wherein the apparatus is implemented in a centralized manner utilizing a central controller.

19. A processor-readable medium embodied with executable instructions for use in routing virtually-concatenated data traffic in a network comprising a plurality of nodes, the plurality of nodes including one or more nodes that are differential delay enabled and one or more nodes that are not differential delay enabled, the instructions when executed in a processor, for a given traffic demand to be routed from a source node to a destination node in the network, performing the steps of:
- determining at least one route for routing the demand between an intermediate node that is differential delay enabled and one of the source node and the destination node that is not differential delay enabled; and
- determining a set of routes for routing the demand between the intermediate node that is differential delay enabled and at least one other node of the network, each of the routes in the set corresponding to a member of a virtually-concatenated group;
- wherein a given unit of flow within the given traffic demand is routed from the source node to the destination node over both a first route and a second route, the first route being within the at least one route and the second route being within the set of routes.

* * * * *

UNITED STATES PATENT AND TRADEMARK OFFICE
CERTIFICATE OF CORRECTION

PATENT NO. : 7,652,986 B2 Page 1 of 1
APPLICATION NO. : 10/856444
DATED : January 26, 2010
INVENTOR(S) : Nagesh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1444 days.

Signed and Sealed this

Twenty-eighth Day of December, 2010

David J. Kappos
*Director of the United States Patent and Trademark Office*